United States Patent
Engelmann et al.

(10) Patent No.: US 8,128,526 B2
(45) Date of Patent: Mar. 6, 2012

(54) LIMITED SLIP DIFFERENTIAL WITH END TEETH

(75) Inventors: Michael Engelmann, St. Augustin (DE); Ralf Pfeifer, Bensberg (DE)

(73) Assignee: GKN Driveline International GmbH, Lohmar (DE)

( * ) Notice: Subject to any disclaimer, the term of this patent is extended or adjusted under 35 U.S.C. 154(b) by 729 days.

(21) Appl. No.: 12/209,825

(22) Filed: Sep. 12, 2008

(65) Prior Publication Data

US 2009/0069139 A1 Mar. 12, 2009

(30) Foreign Application Priority Data

Sep. 12, 2007 (DE) .................. 10 2007 043 437

(51) Int. Cl.
*F16H 48/20* (2006.01)
(52) U.S. Cl. ........................................ 475/249
(58) Field of Classification Search .................. 475/248, 475/249, 252, 253
See application file for complete search history.

(56) References Cited

U.S. PATENT DOCUMENTS

| | | | |
|---|---|---|---|
| 6,080,076 A | 6/2000 | Kwoka et al. | |
| 6,955,626 B2 * | 10/2005 | Yoshihama et al. | 475/248 |
| 7,056,256 B2 * | 6/2006 | Asahi | 475/249 |
| 7,097,585 B2 | 8/2006 | Nishiji et al. | |
| 2005/0090359 A1 * | 4/2005 | Kai et al. | 475/248 |
| 2005/0143212 A1 * | 6/2005 | Yoshiyama et al. | 475/248 |
| 2006/0160652 A1 | 7/2006 | Maki et al. | |
| 2008/0004152 A1 * | 1/2008 | Yamazaki | 475/252 |
| 2008/0026900 A1 * | 1/2008 | Gotoh et al. | 475/220 |

FOREIGN PATENT DOCUMENTS

JP 2004353706 A * 12/2004

* cited by examiner

*Primary Examiner* — Roger Pang
(74) *Attorney, Agent, or Firm* — Rader, Fishman & Grauer PLLC

(57) ABSTRACT

The invention relates to a limited slip differential, more particularly for being used in the driveline of a motor vehicle. The limited slip differential 2 comprises a carrier element 3 which is rotatingly drivable around an axis of rotation A; a plurality of planetary gears 4 which rotate around the axis of rotation A together with the carrier element 3; a hollow gear 5 which is supported so as to be rotatable around the axis of rotation A and which engages at least some of the planetary gears 4; an adapter gear 7 which engages either the hollow gear 5 or the sun gear 6 via a toothed coupling 12 for the purpose of transmitting torque, and wherein the toothed coupling 12 comprises a first face toothing 14 at an end face of the adapter gear 7 and a second face toothing 13 at an end face of the gear engaging the adapter gear.

20 Claims, 5 Drawing Sheets

LIMITED SLIP DIFFERENTIAL WITH END TEETH

TECHNICAL FIELD

The invention relates to a limited slip differential, more particularly to a torque sensing planetary gear differential for use in the driveline of a motor vehicle.

BACKGROUND OF THE INVENTION

U.S. Pat. No. 6,080,076 discloses a torque sensing limited slip differential which includes a carrier element, two sideshafts as well as two groups of differential gears. The differential gears are rotatably supported in cylindrical pockets in the carrier element, which cylindrical pockets extend parallel to the axis of rotation. The side gears and the differential gears comprise helical gears, as a result of which there occur friction forces when the two side gears rotate relative to one another. In this way there is generated between the two axle shaft gears a torque-dependent locking moment which leads to the speeds to be adjusted to one another. Such limited slip differentials are offered and distributed under the name of Powr Trak differentials.

US 2006/0160652 A1 proposes a similar limited slip differential in the form of a end gear differential having a coupling with a ramp assembly arranged between the two side gears.

U.S. Pat. No. 7,097,585 discloses torque-sensing limited slip differential with a carrier element. There is provided a plurality of planetary gears which are rotatably held in the carrier element and rotate jointly therewith. The planetary gears engage a hollow gear on the one hand and a sun gear on the other hand. The hollow gear is connected in a rotationally fast way to a coupling gear via helical gears, so that axial forces are generated when the gears rotate relative to one another. The axial forces are supported via friction discs relative to the carrier element, as a result of which there is achieved a locking effect.

SUMMARY OF THE INVENTION

The present invention proposes a limited slip differential, more particularly a torque sensing face gear differential which is used in the driveline of a motor vehicle, which is able to generate high locking moments and which comprises a simple and compact design.

In accordance with the invention, a limited slip differential is provided, more particularly for being used in the driveline of a motor vehicle, comprising a carrier element which is rotatingly drivable around an axis of rotation; a plurality of planetary gears which rotate around the axis of rotation together with the carrier element; a hollow gear which is supported so as to be rotatable around the axis of rotation and which engages at least some of the planetary gears; a sun gear which is supported so as to be rotatable around the axis of rotation and which sun gear engages at least some of the planetary gears; an adapter gear which engages either the hollow gear or the sun gear via a toothed coupling for the purpose of transmittig torque, wherein the toothed coupling comprises a first face toothing at an end face of the adapter gear and a second face toothing at an end face of the gear engaging the adapter gear, i.e. the hollow gear or the sun gear.

The advantage of the inventive limited slip differential is derived from the design of the toothed coupling having face toothings which generate particularly high axial expanding forces when a speed differential occurs between the output gears. This is due to the fact that the teeth of the first and of the second face toothings comprise tooth flanks which extend at an angle relative to the axis of rotation. A driving moment, which occurs, generates axially effective expanding forces which load the adapter gear axially away from the opposed gear, which, in turn, results in a high locking effect and leads to an uneven torque distribution and to the speeds between the output gears being adjusted to one another.

In principle, the face toothings of the adapter gear and of the opposed gear can have any shape. According to a first possibility, the toothed coupling is of the crown toothing type, with the two face toothings being provided in the form of crown toothing. The crown gears correspond to one another and comprise a variable angle of engagement, i.e. the angle of engagement changes along the tooth length. A second possibility consists in the toothed coupling being provided in the form of a Hirth-toothing, with the teeth of the Hirth-toothing comprising a constant angle of engagement along the tooth length. According to a further possibility, the toothed coupling can also be provided with a conical toothing, with the two face toothings being conical. It is also conceivable that the teeth of the face toothings are arch-shaped.

According to one embodiment, the adapter gear, in a first axial direction in which the expanding forces act, is at least indirectly axially supported relative to the carrier element. "At least indirectly" in this context means that between the adapter gear and the carrier element, it is possible to insert further friction-increasing components, for particularly one or several intermediate friction discs. The at least one friction disc is preferably arranged between a rear radial end face of the adapter gear and an opposed radial supporting face of the carrier element. The carrier element which can also be referred to as planetary carrier or web element comprises a cup-shaped housing part and a cover part firmly connected thereto. The axial support of the adapter gear is always effected relative to one of said parts of the carrier element.

In a second direction opposed to the first direction, the adapter gear is also axially supported at least indirectly relative to the carrier element, with axial supported being effected via the counter gear which is engaged by the adapter gear, i.e. via the hollow gear and sun gear. The counter gear, in turn, is axially supported relative to the carrier element, and for generating a high locking moment, it is advantageous if there is arranged at least one friction disc between a supporting face of the carrier element and an end face of the counter gear.

According to one embodiment, it is proposed furthermore that the second output gear which does not engage the adapter gear, i.e. the sun gear or the hollow gear, is axially supported in both axial directions. The second output gear is preferably axially supported in the first direction relative to the adapter gear which, in turn, is axially supported relative to the carrier element. To achieve a high locking moment, it is advantageous if there is arranged at least one friction disc between a radial abutment face of the adapter gear and an end face of the second output gear. In the opposite direction, the second output gear is directly axially supported against the carrier element, preferably with a friction disc arranged therebetween.

According to a first embodiment, the toothed coupling is effective between the hollow gear and the adapter gear, with the adapter gear and the sun gear more particularly serving output purposes and with each comprising a splined toothing for transmitting torque to the associated output shaft. The hollow gear may be provided in the form of a, more particularly, cylindrical sleeve part, with the face toothing being formed at the end face of the sleeve part. This is advantageous in that production is easy, i.e. the production of the inner teeth which are engaged by the planetary gears and also of the face toothing in order to achieve a rotationally fast connection with the adapter gear. According to an alternative embodiment, the hollow gear can also be cup-shaped, comprising a sleeve part and an adjoining bottom part. In this embodiment, the face toothing of the hollow gear are preferably provided at an end face of the bottom part. The sleeve part and the bottom part can be produced in one piece or they can first be produced separately and subsequently firmly connected to one another, more particularly by welding. The latter embodiment is advantageous in that the inner teeth of the sleeve part are easy to produce.

According to a second embodiment, the toothed coupling is effective between the sun gear and the adapter gear, with the adapter gear and the hollow gear, more particularly, serving output purposes and each comprising a splined toothing for transmitting torque to an associated output shaft.

According to a further embodiment, the inventive limited slip differential is provided in the form of a double planetary differential, with the planetary gears comprising a first group of planetary gears which engage the hollow gear, as well as a second group of planetary gears which engage the sun gear, with each planetary gear of the first group engaging an associated planetary gear of the second group of planetary gears. This embodiment makes it possible for the inventive limited slip differential to be used in a front axle with a transversely installed engine. Preferably, one of the gears, i.e. the hollow gear or sun gear, forms the input gear of the limited slip differential; the carrier element and the respective other one of the gears, i.e. the sun gear or hollow gear, then form the output gears of the limited slip differential.

A further advantage consists in that the locking characteristics of the inventive limited slip differential can be modified and adapted to actual requirements by designing the teeth of the toothed coupling accordingly. Thus the teeth of the first and of the second face toothings—if viewed in a cylindrical section—can be symmetrical relative to one another, which leads to the same locking behavior in both torque transmitting directions. If a different locking behavior is required for each torque transmitting direction, the teeth of the face toothings can be designed so as to be asymmetric. Furthermore, it is possible to vary the degree of locking along the axial setting path in that the teeth of the first and of the second face toothings are provided with a variable profile angle along the tooth height. If, in contrast hereto, the teeth comprise a constant profile angle along the tooth height, the locking behavior along the axial adjustment path is constant. A further possibility of designing the locking characteristics of the inventive limited slip differential consists in that the teeth of the first and of the second face toothings comprise a variable profile angle along the tooth width, such as it is the case with crown teeth. When using crown teeth it is possible to use the tooth form in order to achieve a degressive characteristic curve which results from the widening of the two toothed parts and the related carrying characteristic.

According to one design which applies to all the above-mentioned embodiments, there are provided spring means which load the adapter gear in the axial direction. The spring means can be arranged at any point in the power flow between the two opposed supporting faces of the carrier element. For example, the spring means can be arranged between the adapter gear and the associated supporting face against which the adapter gear is axially supported. The spring means which can be provided in the form of plate springs, for example, generate an axial pretension, so that there is achieved an ever higher locking moment when the two output gears rotate relative to one another.

BRIEF DESCRIPTION OF THE DRAWINGS

Preferred embodiments will be explained below with reference to the drawings wherein.

DETAILED DESCRIPTION OF A PREFERRED EMBODIMENT

Figure 1:
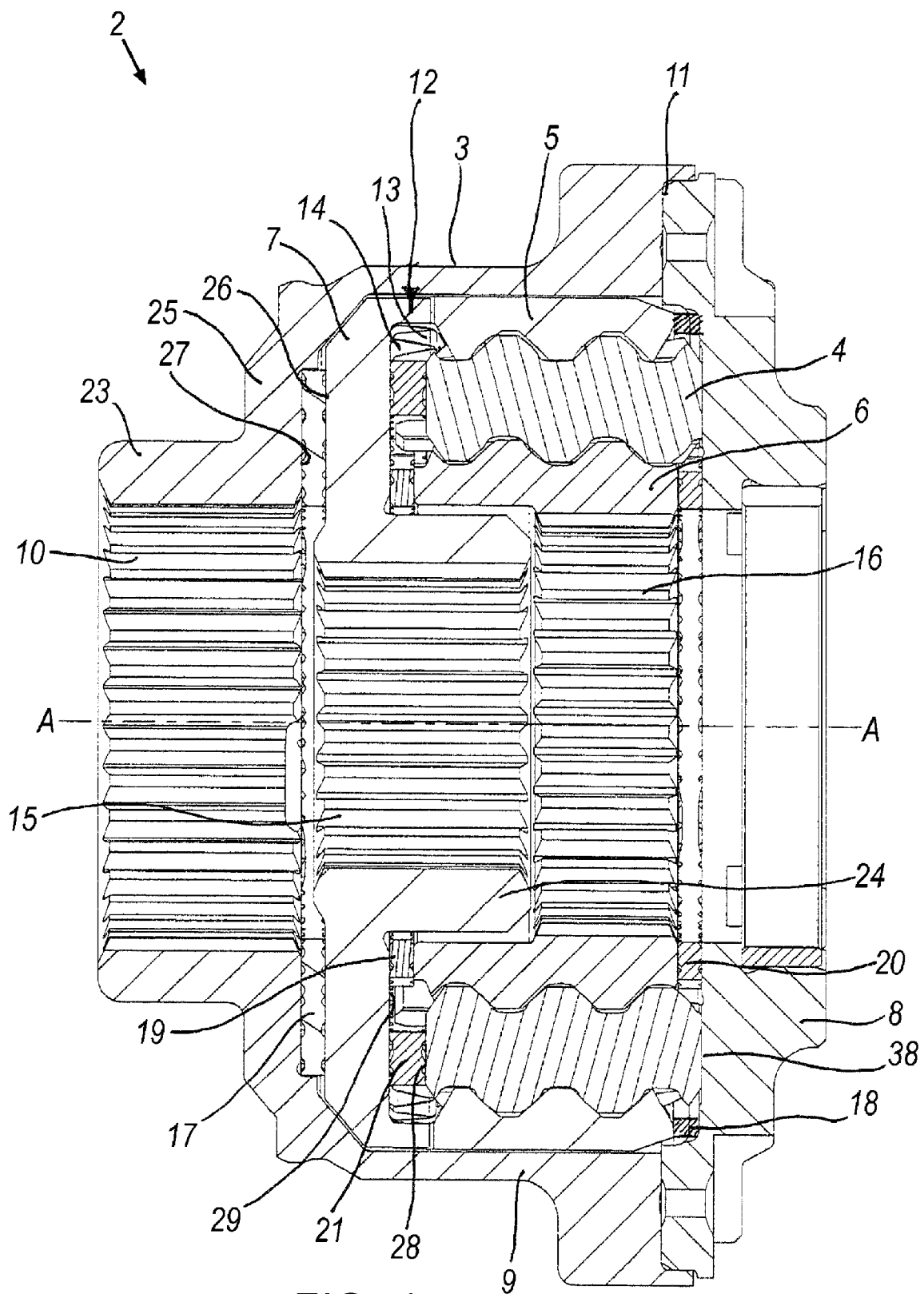
FIG. 1 is a longitudinal section through an inventive limited slip differential in a first embodiment.
Figure 2A:
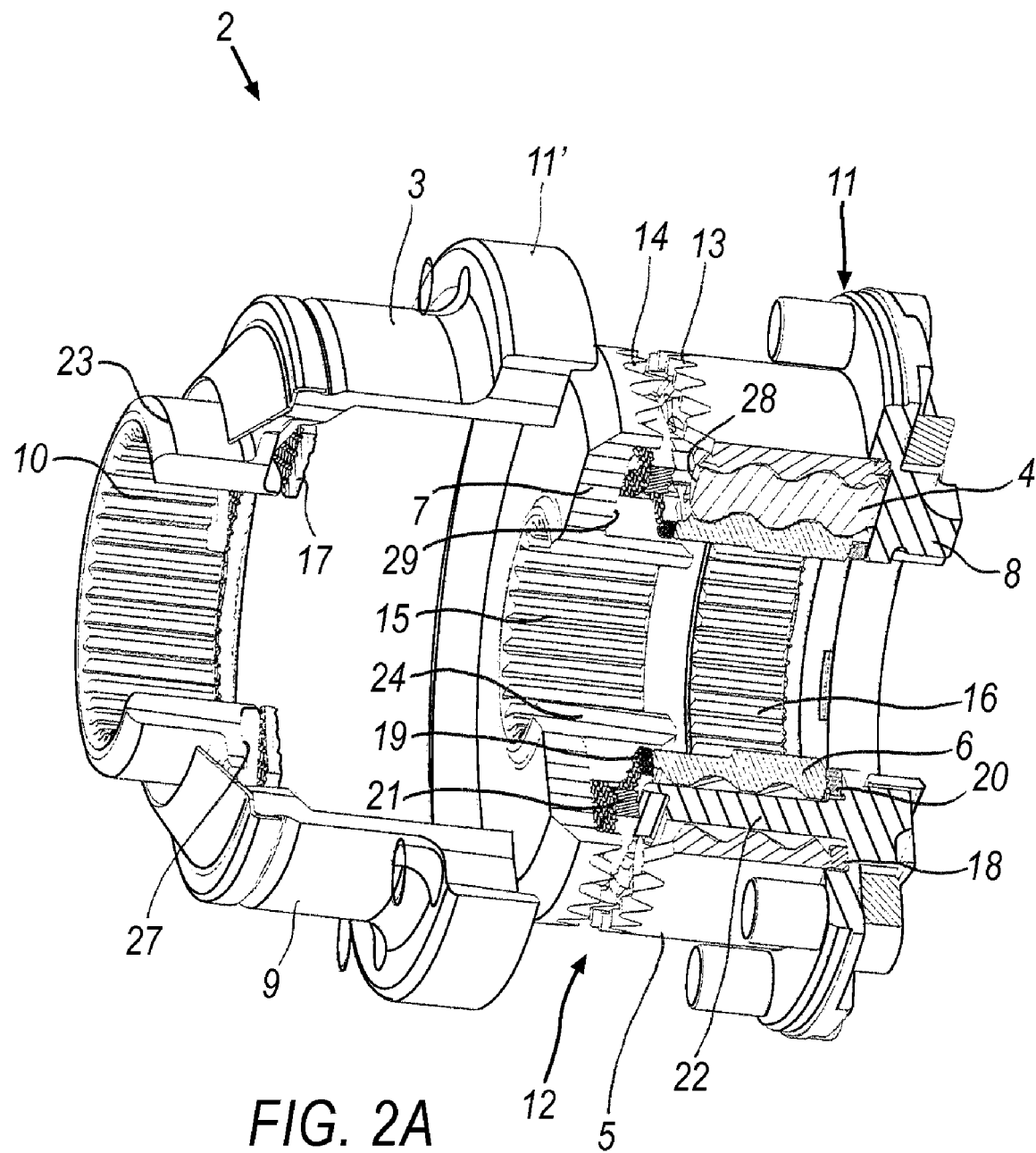
FIG. 2 shows the limited slip differential according to FIG. 1 in an exploded view
 a) in a perspective view, partially cut way,
 b). in a longitudinal section
Figure 2B:
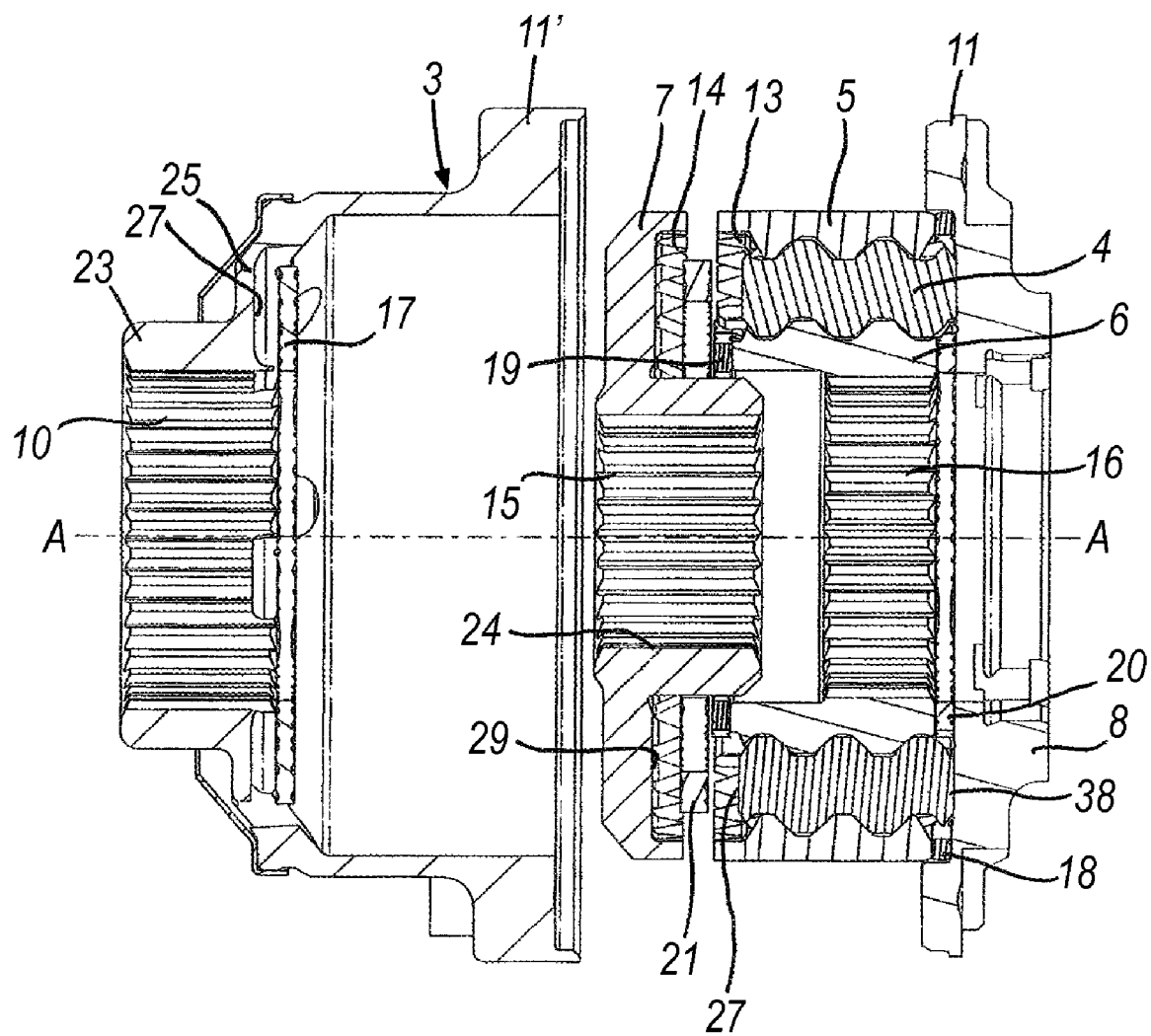

FIGS. 1 and 2 will be described jointly below. They show a limited slip differential 2 which comprises a carrier element 3 which is rotatingly drivable around an axis of rotation A, as well as a set of planetary gears received in the carrier element 3. The set of planetary gears comprises a plurality of circumferentially distributed planetary gears 4 which are each rotatingly held relative to the carrier element 3 and jointly rotate therewith around the axis of rotation A, as well as a hollow gear 5 and a sun gear 6 which are both received in the carrier element 3. By means of their teeth in the form of helical teeth. The toothings of the planetary gears 4, which are preferably in form of helical toothings, engage a corresponding inner toothing of the hollow gear 5 on the one hand and a corresponding outer toothing of the sun gear 6 on the other hand. The hollow gear 5 is freely rotatably held in the carrier element 3 so as to extend coaxially relative to the axis of rotation A and, via a toothed coupling 12, engages an adapter gear in order to transmit torque.

The carrier element 3 is produced in two parts and comprises a cover part 8 which, via a flanged connection 11, is firmly connected to a casing part 9 of the carrier element 3. As is particularly obvious in FIG. 2, the cover part 8 comprises a plurality of circumferentially extending webs 22 which are interrupted by gaps. In each gap between two circumferentially distributed webs 22, there is received a planetary gear 4 which thus jointly rotates with the carrier element 3 around the axis of rotation A. If an inventive limited slip differential 2 is used as a central differential between two driving axles of a motor vehicle, the carrier element 3 and the planetary gears 4 respectively serve as the input part and the sun gear 6 and the adapter gear 7 serve as the output parts. A torque introduced into the carrier element 3 is thus transmitted to the sun gear 6 on the one hand and to the adapter gear 7 on the other hand. For introducing the torque, the carrier element 3 comprises a sleeve projection 23 with a splined toothing 10 which can be introduced into a driveshaft in a rotationally fixed way. Accordingly, the sun gear 6 comprises a bore with an inner toothing 16 into which the output shaft may be inserted in a rotationally fixed way. Furthermore, the adapter gear 7 comprises a hub 24 with a further splined toothing 15 for transmitting torque to a second output shaft.

Below, there will follow a description of the way in which the inventive limited slip differential 2 functions. If the two vehicle output shafts rotate at the same speed, the sun gear 6 and the adapter gear 7 as well as the hollow gear 5 also jointly rotate block-wise around the axis of rotation A. If, however, there exists a speed differential between the two output gears, i.e. the sun gear 6 and the adapter gear 7, there are generated axial forces in the toothed coupling 12, which axial forces axially load the adapter gear 7 on the one hand and the hollow gear 5 on the other hand in opposite directions. The adapter gear 7 is thus loaded towards a bottom 25 of the carrier element 3 rotating at a deviating speed around the axis of rotation A. Between a radial end face 26 of the adapter ring 7 and a corresponding radial supporting face 27 of the carrier element 3, there is arranged a friction disc 17 which ensures that the components 7, 3 rotating at different speeds around the axis of rotation A are braked relative to one another. Furthermore, it can be seen that the hollow gear 5 is axially supported relative to the cover part 8 of the carrier element 3, with a further friction disc 18 being inserted therebetween. The friction disc 18, if there occurs a speed differential, also generates a friction effect and thus an equalization of the speeds and thus causes the differential 2 to be locked.

The circumferentially distributed planetary gears 4 each comprise an end face 28, 38, with a further friction disc 21 being provided between the end face 28 and the axially opposed abutment face 29 of the adapter gear 7. At their ends opposed to the adapter gear 7, the planetary gears 4, by means of their end faces 38, are directly axially supported relative to the cover part 8 of the carrier element 3. The sun gear 6 is axially supported via further friction discs 19, 20.

Because the inventive limited slip differential 2 is provided with a toothed coupling 12 with face toothings, it has a particularly great locking effect because if there occurs a speed differential between the output gears 6, 7, there are generated high axial locking forces. The gears 4, 5, 6 of the differential gear set, because of the expanding forces, are at least indirectly loaded via the friction discs 17, 18, 19, 20, 21 against the carrier element 3, so that the speeds are equalized, thus achieving a locking effect. In the present embodiment, the toothed coupling 12 comprises a first face toothing 13 at one end face of the adapter gear 7 as well a second face toothing 14 at an end face of the hollow gear 5.

Figure 3:
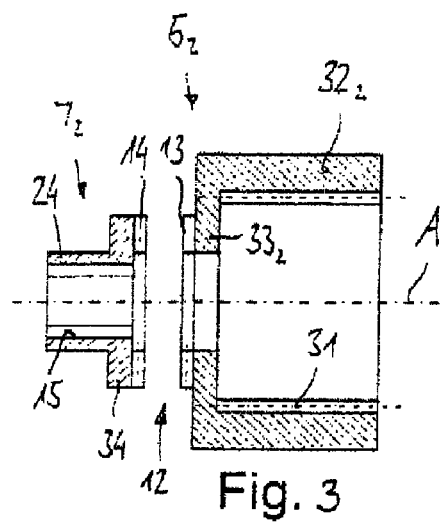
FIG. 3 is a cross-sectional illustration of a hollow gear/adapter gear assembly for an inventive limited slip differential in a second embodiment.

FIG. 3 is an illustration of an assembly consisting of a hollow gear $5_2$ and an adapter gear $7_2$ for a limited slip differential according to FIGS. 1 and 2. The assembly as illustrated is intended to be inserted into a carrier element, with the hollow gear $5_2$ and an adapter gear $7_2$ being at least indirectly axially supported axially supported relative to the carrier element. Identical components have been given the same reference numbers as in FIG. 1 and the reference numbers of the modified components have been provided with respective subscripts. In the present embodiment, the hollow gear $5_2$ is cup-shaped and comprises a sleeve part 32 and an adjoining bottom part 33. The inner face of the sleeve part 32 is shown to comprise the inner toothing 31 which are engaged by the planetary gears. Furthermore, it is possible to see the face toothing 13 which is arranged at the end face of the bottom part 33. At the axially opposed end of the bottom part 33, there is arranged the adapter gear $7_2$ which comprises a hub 24 and an adjoining radial portion 34. The second face toothing 14 which is engaged by the first face toothing 13 for torque transmitting purposes is formed in the radial portion 34.

Figure 4:
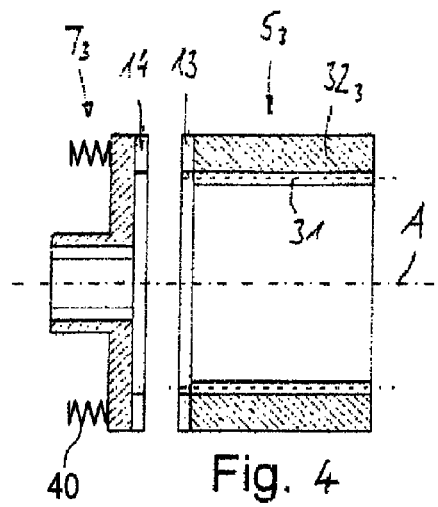
FIG. 4 is a cross-sectional illustration of a hollow gear/adapter gear assembly for an inventive limited slip differential in a third embodiment.

FIG. 4 shows a further embodiment of the hollow gear/adapter gear assembly in a diagrammatic view which can also be used in a limited slip differential according to FIGS. 1 and 2. Identical components have been given the same reference numbers and the reference numbers of modified components have been provided with the subscript "3". The present embodiment has a special feature in that the hollow gear $5_3$ is sleeve-shaped, with the first face toothing 13 being formed at an end face of the sleeve part 32. Accordingly, the second face toothing 14 of the adapter gear $7_3$ is arranged on a greater radius. The present embodiment is advantageous in that the hollow gear $5_3$ is cheap and easy to produce in that the inner toothing 31 can easily be produced by a production method with an axial movement of feed. Spring means 40 may be provided to load the adapter gear $7_3$ in the axial direction.

Figure 5:
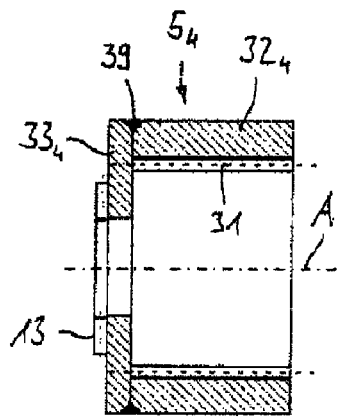
FIG. 5 is a cross-sectional illustration of a hollow gear/adapter gear assembly for an inventive limited slip differential in a fourth embodiment.

This embodiment of a hollow gear/adapter gear assembly shown in FIG. 5 largely corresponds to that shown in FIG. 3; to that extent reference is made to the description of same. The only difference consists in that the hollow gear $5_4$ is first produced separately in two parts, i.e. the sleeve part $32_4$ and the bottom part $33_4$ which are subsequently connected to one another, for example by welding. The continuous weld has been given the reference number 39. For the sake of simplicity, the adapter gear 7 has not been shown.

Figure 6:
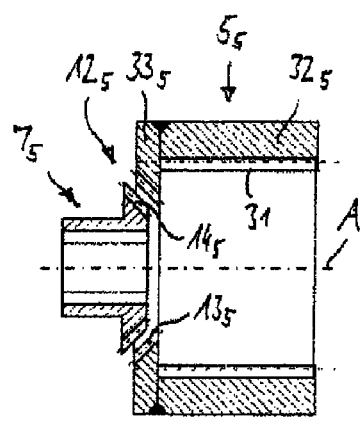
FIG. 6 is a diagrammatic illustration of a hollow gear/adapter gear assembly for an inventive limited slip differential in a fifth embodiment.

FIG. 6 shows a hollow gear/adapter gear assembly in a further embodiment such as it is used in a limited slip differential according to FIGS. 1 and 2. Identical components have been given the same reference numbers as in FIG. 3, to the description of which reference is hereby made as far as common features are concerned. The present embodiment is characterized in that the toothed coupling $12_5$ comprises a first conical face toothing $13_5$ in the bottom part 33 of the hollow gear $5_5$ and a corresponding conical face toothing $14_5$ at the adapter gear $7_5$. This design achieves an axially short unit.

Figure 7:
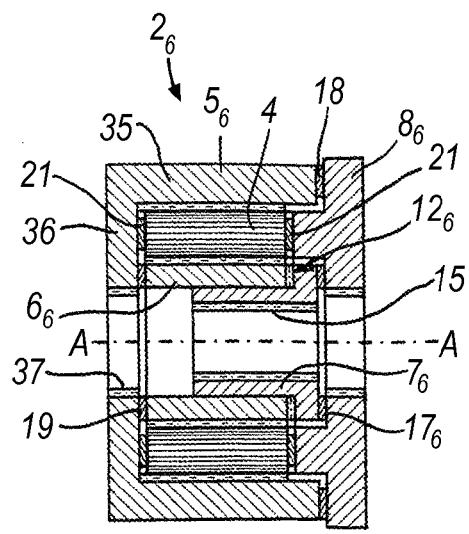
FIG. 7 is a longitudinal section through an inventive limited slip differential in a sixth embodiment.

FIG. 7 is a diagrammatic illustration of an inventive limited slip differential $2_6$ in a further embodiment in a longitudinal section. In respect of design and functioning, the limited slip differential $2_6$ shown here largely corresponds to that shown in FIGS. 1 and 2, so that reference is made thereto as far as the common features are concerned. Identical components have been given the same reference numbers and the reference numbers of modified components have been provided with the subscript "6". The present embodiment differs from FIG. 1 in that the adapter gear $7_6$, via the toothed coupling $12_6$, engages the sun gear $6_6$. The hollow gear $5_6$ is cup-shaped and comprises a cylindrical portion 35 and a radial bottom portion 36 with an inner splined toothing 37 which serves to transmit torque to an inserted shaft. The sun gear $6_6$ is rotatably supported on an externally cylindrical face of the adapter gear $7_6$. The planetary gears 4 are received in circumferentially distributed pockets of the cover part $8_6$ and rotate jointly therewith around the longitudinal axis A. The cylindrical part of the carrier element 3 is not illustrated in the present embodiment.

Figure 8A:
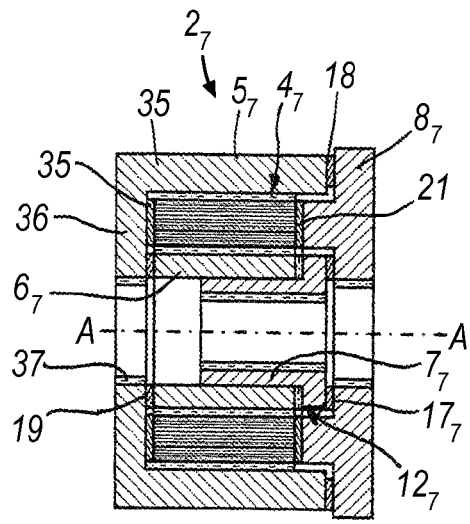
FIG. 8 shows an inventive limited slip differential in a seventh embodiment in a diagrammatic cross-section
 a) in a longitudinal section
 b) in a cross-sectional view
Figure 8B:
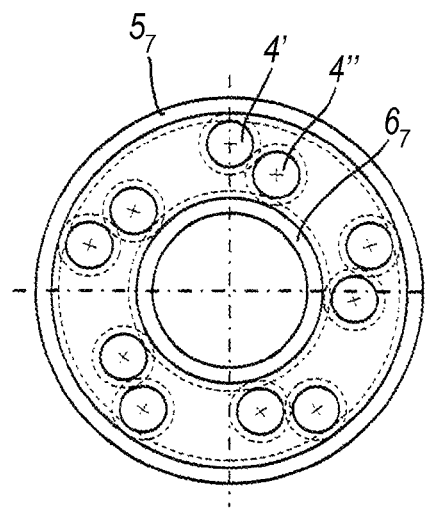

FIGS. 8a) and b) show an inventive limited slip differential $2_7$ in a further embodiment. In respect of design and functioning, the present limited slip differential largely corresponds to that shown in FIG. 7, to the description of which reference is therefore made. Identical parts have been given the same reference numbers and the reference numbers of modified parts have been provided with the subscript "7". The special characteristic of the present embodiment consists in that it is a so-called double planetary differential. As is particularly obvious from FIG. 8a), there are provided two groups of planetary gears 4', 4", with the first planetary gears 4' engaging the hollow gear $5_7$ and with the second planetary gears 4" engaging the sun gear $6_7$. Each planetary gear 4' of the first group of planetary gears engages a planetary gear 4" of the second group of planetary gears. By providing two groups of planetary gears it is ensured that the hollow gear $5_7$ and the sun gear $6_7$ rotate in the same direction of rotation. Otherwise, the present limited slip differential corresponds to the above embodiment. More particularly, between the sun gear $6_7$ and the adapter gear $7_7$ there is arranged the toothed coupling 12 which generates a high locking effect if there occurs a speed differential between the two output gears. The present limited slip differential $2_7$ is advantageous in that the hollow gear $5_7$ and the sun gear $6_7$ can also be used as input gears, so that the differential is particularly suitable for being used in a front axle of a motor vehicle with a transversely installed engine.

There will now follow a description of the various pairs of engaging teeth of the toothed coupling 12. The tooth profiles diagrammatically illustrated in FIGS. 9 to 12 can, in principle, be used in each of the above-described limited slip differentials according to FIG. 1 to 8.

Figure 9:
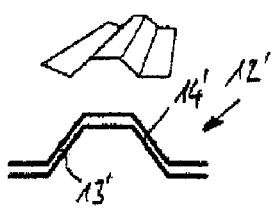
FIG. 9 is a diagrammatic illustration of the tooth profile of the toothed coupling of an inventive limited slip differential according to any one of the embodiments of FIG. 1 to FIG. 8 in a first embodiment.

It can be seen that the tooth profiles of the toothed coupling 12' as illustrated in FIG. 9 are provided in the form of a Hirth-toothing, with the tooth flanks of the first and of the second face toothings 13', 14' being symmetrical relative to one another. As a result of this design, the locking moments generated between a positive torque and a negative torque, i.e. between traction mode and coasting mode are identical.

Figure 10:
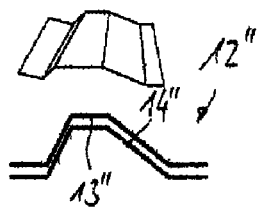
FIG. 10 is a diagrammatic illustration of the tooth profile of the toothed coupling of an inventive limited slip differential according to any one of the embodiments of FIG. 1 to FIG. 8 in a second embodiment.

On the other hand, the tooth profile of the toothed coupling 12" as illustrated in FIG. 10 is asymmetric. This ensures that under conditions of traction operation there are achieved different locking characteristics of the limited slip differential 2 than under conditions of coasting. As a result of the concrete geometry of the tooth flanks, the locking characteristics of the limited slip differential 2 can be varied. In the case of a toothing with flatter tooth flanks, the equalization of the speeds between the two output gears takes place more slowly, whereas a toothing with steeper tooth flanks generate a faster locking effect.

Figure 11:
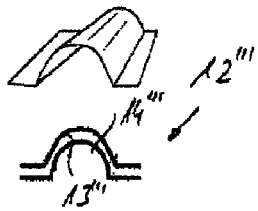
FIG. 11 is a diagrammatic illustration of the tooth profile of the toothed coupling of an inventive limited slip differential according to any one of the embodiments of FIG. 1 to FIG. 8 in a third embodiment.

In the embodiment shown in FIG. 11, the teeth of the first and of the second face toothings 13''', 14''' comprise a variable pitch along the tooth height. For this purpose, the teeth and gaps between teeth are concave and convex respectively. Therefore, in the present embodiment, the axial expanding force increases as the two coupling parts are axially displaced away from one another.

Figure 12:
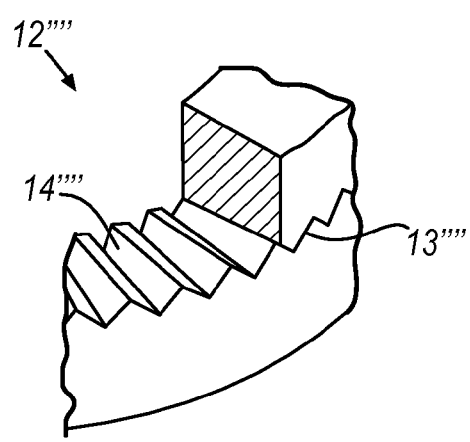
FIG. 12 shows the toothed coupling of one of the inventive limited slip differentials according to any one of the embodiments according to FIG. 1 to FIG. 8 in a fourth embodiment in a three-dimensional illustration, partially in section.

FIG. 12 shows an embodiment wherein the toothed coupling 12'''' is provided in the form of a crown toothing, with the teeth of the first and of the second face toothings 13'''', 14'''' comprising a variable profile angle across the tooth width. With this embodiment with crown toothing, the tooth form can result in a degressive characteristic curve. If no torque is applied, the two face toothings are pushed together. If torque is transmitted, it is transmitted in a radial partial portion only, and with an increasing rate of expansion of the face toothings, the tooth engagement line moves radially outwardly. In this way, there is achieved a degressive increase in the axial force, which leads to a correspondingly degressive rise in the locking moment.

All the above-mentioned embodiments have in common that the teeth of the first and of the second face toothings 13, 14 comprise tooth flanks which extend at an angle relative to the axis of rotation. Said teeth can be radial straight teeth intersecting the axis of rotation A and also helical teeth intersecting the axis of rotation at a distance. This design ensures that if there occurs a speed differential between the two output gears, there are generated particularly high axial expanding forces and thus a high locking effect of the limited slip differential.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

The invention claimed is:

1. A limited slip differential for use in the driveline of a motor vehicle, comprising
a carrier element which is rotatingly drivable around an axis of rotation (A);
a plurality of planetary gears which rotate around said axis of rotation (A) together with said carrier element;
a hollow gear which is supported so as to be rotatable around said axis of rotation (A), said hollow gear engaging at least some of said planetary gears;
a sun gear which is supported so as to be rotatable around the axis of rotation (A), said sun gear engaging at least some of said planetary gears;
an adapter gear which engages either said hollow gear or said sun gear via a toothed coupling for the purpose of transmitting torque,
said toothed coupling comprises a first face toothing at an end face of said adapter gear and a second end toothing at an end face of the gear engaging said adapter gear.

2. A limited slip differential according to claim 1, wherein said toothed coupling is of the crown toothing type.

3. A limited slip differential according to claim 1, wherein said toothed coupling is of the Hirth-toothing type.

4. A limited slip differential according to claim 1, wherein said first and second face toothings are conical.

5. A limited slip differential according to claim 1, wherein, in a first axial direction, said adapter gear is at least indirectly axially supported relative to said carrier element by way of an intermediate friction disc.

6. A limited slip differential according to claim 5, wherein in a second axial direction, said adapter gear is at least indirectly axially supported relative to said carrier element, by way of an intermediate friction disc.

7. A limited slip differential according to claim 1, wherein said adapter gear is at least indirectly axially supported relative to an end face of said sun gear, wherein said sun gear is at least indirectly axially supported relative to said carrier element.

8. A limited slip differential according to claim 1, wherein said toothed coupling is provided between said hollow gear and said adapter gear, wherein said adapter gear and said sun gear each comprise a splined toothing for torque output transmitting purposes.

9. A limited slip differential according to claim 1, wherein said hollow gear is cup-shaped and comprises a casing part and an adjoining bottom part, wherein the second end toothing is provided at the end face of said adjoining bottom part.

10. A limited slip differential according to claim 8, wherein said casing part and said bottom part are produced so as to form one piece.

11. A limited slip differential according to claim 9, wherein said casing part and said bottom part are produced separately and firmly connected to one another by way of welding.

12. A limited slip differential according to claim 1, wherein said hollow gear comprises a sleeve part, wherein said second end toothing is formed at the end face of said sleeve part.

13. A limited slip differential according to claim 1, wherein said toothed coupling is provided between said sun gear and said adapter gear, wherein said adapter gear and said hollow gear each comprise a splined toothing for torque output transmitting purposes.

14. A limited slip differential according to claim 1, wherein the limited slip differential comprises a double planetary differential, wherein said planetary gears comprise a first group of planetary gears which meshingly engage said hollow gear, as well as second group of planetary gears which meshingly engage said sun gear, wherein each planetary gear of said first group engages an associated planetary gear of said second group.

15. A limited slip differential according to claim 1, wherein teeth of said first and second end toothings, if viewed in a cylindrical section, are designed to be symmetrical relative to one another.

16. A limited slip differential according to claim 1, wherein teeth of said first and second face toothings, if viewed in a cylindrical section, are designed to be asymmetrical relative to one another.

17. A limited slip differential according to claim 1, wherein teeth of said first and second face toothings comprise a constant profile angle along the tooth height.

18. A limited slip differential according to claim 1, wherein teeth of said first and second face toothings comprise a variable profile angle along the tooth height.

19. A limited slip differential according to claim 1 further comprising:
   spring means which load said adapter gear in the axial direction.

20. A limited slip differential according to claim 1, wherein teeth of said first and second face toothings comprise a variable profile angle across the tooth width.

* * * * *